United States Patent [19]

Saita

[11] Patent Number: 5,424,802
[45] Date of Patent: Jun. 13, 1995

[54] PHOTOGRAPHIC PRINTER

[75] Inventor: Hirofumi Saita, Kanagawa, Japan

[73] Assignee: Fuji Photo Film Co., Ltd., Kanagawa, Japan

[21] Appl. No.: 235,964

[22] Filed: May 2, 1994

[30] Foreign Application Priority Data

Apr. 30, 1993 [JP] Japan .................................. 5-124620

[51] Int. Cl.⁶ ............................................. G03B 27/54
[52] U.S. Cl. ........................................ 355/43; 355/38; 355/68; 355/71
[58] Field of Search ......................... 355/38, 43, 68, 71

[56] References Cited

U.S. PATENT DOCUMENTS 5,122,831  6/1992  Suzuki .
5,155,524 10/1992  Oberhardt et al. .

FOREIGN PATENT DOCUMENTS 52-20853  6/1977  Japan ........................... G03B 27/32
64-10819  2/1989  Japan ........................... G03B 27/72

Primary Examiner—M. L. Gellner
Assistant Examiner—Daniel P. Malley
Attorney, Agent, or Firm—Sughrue, Mion, Zinn, Macpeak & Seas; Richard C. Turner

[57] ABSTRACT

A photographic printer has a first polarizing beam splitter for splitting light from a light source into a first polarized light and a second polarized light. The first polarized light passes through a first liquid crystal cell having a liquid crystal material held between grid-like transparent electrodes. At this time, the plane of polarization of the first polarized light is changed in each small region formed in the liquid crystal cell. The first polarized light then enters a second polarizing beam splitter. On the other hand, the second polarized light enters the second polarizing beam splitter after its plane of polarization has been changed. At the second polarizing beam splitter, the first polarized light and the second polarized light are combined and then projected on a print paper via a photographic film so that an image recorded on the photographic film is exposed and printed on the print paper. Accordingly, the time required for exposure can be shortened compared to conventional photographic printers using polarizing plates.

20 Claims, 4 Drawing Sheets

⊙ LIGHT VIBRATING IN PLANE PERPENDICULAR TO SHEET
— LIGHT VIBRATING IN PLANE PARALLEL TO SHEET

⊙ LIGHT VIBRATING IN PLANE PERPENDICULAR TO SHEET
↔ LIGHT VIBRATING IN PLANE PARALLEL TO SHEET

⊙ LIGHT VIBRATING IN PLANE PERPENDICULAR TO SHEET
— LIGHT VIBRATING IN PLANE PARALLEL TO SHEET

PHOTOGRAPHIC PRINTER

BACKGROUND OF THE INVENTION

1. Field of the Invention

The present invention relates to a photographic printer for exposing and printing on a light-sensitive material an image recorded on a photographic film, and in particular to a photographic printer which is capable of accurately and easily controlling the amount of light reaching each of a plurality of small regions of a light-sensitive material so as to perform density compensation, color compensation and the like.

2. Description of the Related Art

An example of an apparatus for exposing and printing on a light-sensitive material an image recorded on a photographic film is disclosed in Japanese Patent Publication (Kokoku) Sho. 52-20853. In that apparatus, light is projected onto a photographic film on which an image is recorded, and a liquid crystal cell is disposed in the middle of the path of light which has passed through the photographic film. A voltage supplied to the liquid crystal cell is controlled for adjusting the amount of light which forms an image on the light-sensitive material. Also, Japanese Patent Publication (Kokoku) Sho. 64-10819 discloses an apparatus provided with a light source for illuminating an image recorded on a photographic film, and a liquid crystal cell which is disposed between the light source and the photographic film and which includes liquid crystal elements arranged in a matrix. Voltages supplied to the liquid crystal elements are varied to change the amount of light passing through each of the liquid crystal elements, whereby density compensation, color compensation, and the like are carried out for an image exposed on a light-sensitive material.

The apparatus disclosed in Japanese Patent Publication (Kokoku) Sho. 64-10819, however, has the drawback that in order to change the transmittance of the liquid crystal cell, the layer of liquid crystal must be composed of a twisted-nematic liquid crystal or bistable ferroelectric liquid crystal, and a polarizing plate must be disposed on each of the front side (the side facing the light source) and the back side of the layer of liquid crystal. Accordingly, a major part of the light is lost at the polarizing plates and the layer of liquid crystal before reaching the light-sensitive material. The intensity of light forming an image on the light-sensitive material therefore becomes very low compared to that of the light projected on the liquid crystal cell, which brings about a problem that the time required for proper exposure is prolonged.

The above-described apparatus also has the drawback that when the intensity of the light is increased for compensating for the loss of light, polarized light which does not pass the polarizing plates is converted to heat. As the heat accumulates, the temperature of the layer of liquid crystal is elevated, which causes changes in the transparency and hue of the liquid crystal due to the temperature-dependent characteristics of the liquid crystal. In the case where the polarizing plates are of a widely used type in which a base material made of polyvinyl alcohol (PVA) is laminated with triacetyl cellulose (TAC), about 60% of the light is absorbed by the first polarizing plate and about 15% by the second polarizing plate. The absorbed light wastefully changes to heat.

The decrease in the amount of light passing through the liquid crystal cell causes the problems that the time required for exposure becomes long and that a stronger illumination source is needed. Therefore, conventional photographic printers are not satisfactory in terms of printing capacity and consumption of electric power.

SUMMARY OF THE INVENTION

An object of the present invention is to solve the above-described drawbacks in conventional photographic printers, and to provide an improved photographic printer which is capable of efficiently utilizing light without using any polarizing plate, and which is capable of accurately and easily carrying out density compensation and color compensation for each small region of an image recorded on a photographic film, shading, printing of characters, and the like.

According to a first aspect of the present invention, there is provided a photographic printer for exposing and printing onto a light-sensitive material an image recorded on a photographic film which includes:

a light source for illuminating a photographic film;
a first polarizing beam splitter disposed between the light source and the photographic film for splitting light from the light source into a first polarized light and a second polarized light;
a second polarizing beam splitter disposed between the first polarizing beam splitter and the photographic film for combining the first polarized light and the second polarized light; and
a first liquid crystal cell disposed in one of the path of the first polarized light and the path of the second polarized light and including a liquid crystal compound which is held between transparent electrodes which are arranged in a matrix on two opposing surfaces perpendicularly intersecting a corresponding path of light to form grid-like transparent electrodes on the surfaces, the orientation of the liquid crystal compound changing depending on drive signals which are supplied to the grid-like transparent electrodes in accordance with information for compensation.

One of the first and second polarized lights which has passed through the first liquid crystal cell is combined with the other of the first and second polarized lights, and the combined light is projected onto the photographic film so that an image recorded on tile photographic film is exposed on the light-sensitive material and printed thereon.

According to the first aspect of the invention, the first liquid crystal cell is disposed on a selected one of the paths of the first polarized light and the second polarized light which are split from the light from the light source by the first polarizing beam splitter. The first liquid crystal cell has a grid-like electrode on each of the two opposing surfaces perpendicularly intersecting the selected path. The liquid crystal compound held between the grid-like transparent electrodes is composed of a plurality of liquid crystal elements, and the grid-like electrodes are supplied with drive signals or electrical signals so that the beams of light passing through the liquid crystal elements of the first liquid crystal cell are individually polarized in different directions in accordance with image data representing an image recorded on the photographic film. Accordingly, when the selected one of the first and second polarized lights passes the first liquid crystal cell, it is polarized such that plural beams of light passing through the plural liquid crystal elements of the first liquid crystal are individually polarized in different directions. The other of the first and second polarized light reaches the second polarizing beam splitter as is. This other polarized light achieves a major part of exposure while the above-mentioned selected polarized light is controlled by the first liquid crystal for carrying out density compensation and color compensation for images. From the selected polarized light which has entered the first liquid crystal cell, two kinds of beams are produced in accordance with electric signals supplied to the liquid crystal elements. Namely, there are produced a first kind of beams which pass the second polarizing beam splitter and a second kind of beams which are refracted by the second polarizing beam splitter. Beams belonging to one of the two kinds are combined with the other polarized light coming directly from the first polarizing beam splitter, and are used for exposure. With this structure, various types of image processing such as shading, color compensation, printing of characters, masking and the like can be carried out by using a single liquid crystal without loss of light.

According to a second aspect of the present invention, there is provided a photographic printer for exposing and printing which includes:
- a light source for illuminating a photographic film;
- a first polarizing beam splitter disposed between the light source and the photographic film for splitting light from the light source into a first polarized light and a second polarized light;
- a second polarizing beam splitter disposed between the first polarizing beam splitter and the photographic film for combining the first polarized light and the second polarized light;
- a first liquid crystal cell disposed in tile path of the first polarized light and including a liquid crystal compound which is held between transparent electrodes which are arranged in a matrix on two opposing surfaces perpendicularly intersecting the path to form grid-like transparent electrodes on the surfaces, the orientation of the liquid crystal compound changing depending on drive signals which are supplied to the grid-like transparent electrodes in accordance with information for compensation; and
- a second liquid crystal cell disposed in the path of the second polarized light for rotating the axis of polarization by 90° or 270° when the second polarized light passes therethrough.

The first polarized light which has passed through the first liquid crystal cell is combined with the second polarized light which has passed through the second liquid crystal cell, and the combined light is projected onto the photographic film so that an image recorded on the photographic film is exposed on the light-sensitive material and printed thereon.

According to the second aspect of the invention, the first liquid crystal cell is disposed in the path of the first polarized light which is split from the light from the light source by the first polarizing beam splitter. When electrical signals are supplied to the grid-like electrodes to apply electricity to the plurality of liquid crystal elements formed between the grid-like electrodes, beams of light passing through the liquid crystal elements of the first liquid crystal cell are individually polarized in different directions. The second liquid crystal cell is disposed in the path of the second polarized light. The second liquid crystal cell includes a layer of liquid crystal material having a twisted structure with a twist angle of 90° or 270°. Accordingly, the plane of polarization of the second polarized light is rotated by 90° or 270° during the time when the second polarized light passes through the second liquid crystal cell. At the second polarizing beam splitter, beams of light passing through the first liquid crystal elements are split, depending on their directions of polarization, into a first kind of beams which pass through the second polarizing beams splitter, and a second kind of beams which are refracted by the second polarizing beam splitter and used for exposure. Beams belonging to the second kind used for exposure are combined with the second polarized light passed through the second liquid crystal cell to be used for exposure. With this structure, various types of image processing such as shading, color compensation, printing of characters, masking, and the like can be stably carried out without increasing the time for exposure or the amount of light from the light source.

According to a third aspect of the present invention, there is provided a photographic printer for exposing and printing on a light-sensitive material an image recorded on a photographic film which includes:
- a light source for illuminating a photographic film;
- a first polarizing beam splitter disposed between the light source and the photographic Film for splitting light from the light source into first polarized light and second polarized light;
- a second polarizing beam splitter disposed between the first polarizing beam splitter and the photographic film for combining the first polarized light and the second polarized light; and
- a first and a second liquid crystal cell disposed in the path of the first polarized light and the path of the second polarized light, respectively, and each including a liquid crystal compound which is held between transparent electrodes which are arranged in a matrix on two opposing surfaces perpendicularly intersecting a corresponding path of light to form grid-like transparent elements on the surfaces, the orientation of the liquid crystal compound changing depending on drive signals which are supplied to the grid-like transparent electrodes in accordance with information for compensation.

The first polarized light which has passed through the first liquid crystal cell is combined with the second polarized lights which has passed through the second liquid crystal cell, and the combined light is projected onto the photographic film so that an image recorded on the photographic film is exposed on the light-sensitive material and printed thereon.

According to this third aspect of the invention, in contrast to the photographic printer according to the second aspect, the second liquid crystal cell has the same structure as the first liquid crystal cell, i.e. it has grid-like electrodes on the two opposing surfaces perpendicularly intersecting the path of the second polarized light. Since electric signals are applied to the plural liquid crystal elements of the second crystal cell in accordance with the image data representing an image recorded on a photographic film, the second polarized light from the first polarizing beam splitter is polarized when passing through the second liquid crystal cell so that beams of light passing through the plural liquid crystal elements are individually polarized in different directions.

Accordingly, at the second polarizing beam splitter, beams of light passing through the first liquid crystal elements are split, depending on their directions of polarization, into a first kind of beams which pass through the second polarizing beams splitter, and a second kind of beams which are refracted by the second polarizing beam splitter and are used for exposure. Beams to be used for exposure are combined with the second polarized light which has been adjusted by the second liquid crystal, and then are used for exposure. Since the first polarized light and second polarized light are individually adjusted by the first and second liquid crystal cells, respectively, the above-described image processing can be carried out in combination.

The above-mentioned structure may be modified such that light passing through the first polarizing beam splitter is used as first polarized light while light refracted by the first polarizing beam splitter is used as second polarized light.

DESCRIPTION OF THE PREFERRED EMBODIMENTS

Embodiments of the present invention will now be described with reference to the attached drawings.

Embodiment 1

Figure 1:
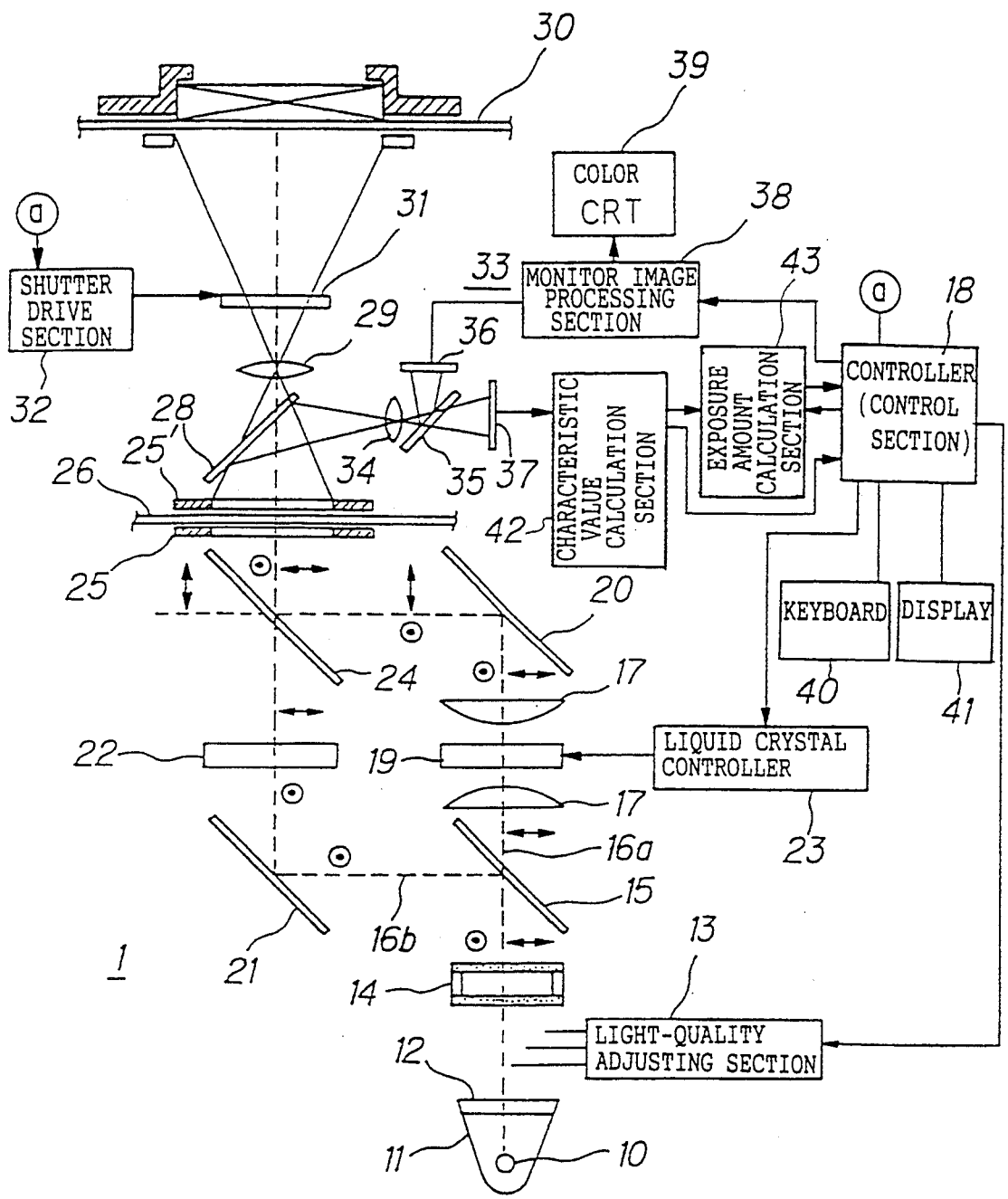
FIG. 1 is a sectional view schematically showing the structure of a photographic printer according to a first embodiment of the present invention.

FIG. 1 is a vertical cross section schematically showing the structure of a photographic printer 1 according to a first embodiment of the present invention.

As shown in the drawing, light emitted from a lamp 10 is reflected by a reflector 11 and enters a light-quality adjusting section 13 which includes cyan (C), magenta (M) and yellow (Y) filters via a heat insulating filter 12. The light-quality adjusting section 13 is controlled by a controller 18 so that the amount of light passing therethrough is controlled according to color.

Disposed above the light-quality adjusting section 13 is a diffusion box 14. The light from the lamp 10 whose quality has been adjusted by the light-quality adjusting section 13 is diffused by the diffusion box 14, and then enters a first polarizing beam splitter 15 which is inclined by 45° with respect to the axis of the radiated light. The light which has entered the first polarizing beam splitter 15 is split into two polarized lights which have different planes of polarization, i.e., first polarized light 16a which passes through the first polarizing beam splitter 15 and a second polarized 16b light which is refracted by the first polarizing beam splitter 15. The first polarized light 16a passing through the first polarizing beam splitter 15 is light vibrating in a plane parallel to the sheet as viewed in FIG. 1, while the second polarized light 16b refracted by the first polarizing beam splitter 15 is light vibrating in a plane perpendicular to the sheet.

The first polarized light 16a passes through a pair of condenser lenses 17 and a first liquid crystal cell 19 disposed therebetween, and then enters a full reflex mirror 20 which is disposed at an incline of 45° with respect to the axis of the light radiated from the lamp 10. The liquid crystal cell 19 includes a liquid crystal material which is held by transparent electrodes disposed in a matrix on two opposing surfaces perpendicular to the path of the first polarized light 16a to form grid-like electrodes on the opposing surfaces. When the transparent electrodes in the liquid crystal cell 19 are supplied with electrical signals equal to or greater than a predetermined voltage (threshold value) by a liquid crystal controller 23 which is controlled by the controller 18, beams of light passing through some of the liquid crystal elements to which electricity is applied are prevented from being polarized so that their planes of polarization are not changed, but beams of light passing through the remainder of the liquid crystal elements are polarized so that their planes of polarization are changed in accordance with the orientation of the liquid crystal elements. The first polarized light 16a which has passed through the liquid crystal cell 19 and was reflected by the reflex mirror 20 enters a second polarizing beam splitter 24.

As described above, the liquid crystal 19 is provided with a pair of grid-like transparent electrodes formed on the two opposing surfaces of the liquid crystal 19. A TN (twisted nematic) liquid crystal or a ferroelectric liquid crystal is inserted between the grid-like transparent electrodes, via an alignment film. The liquid crystal is composed of a plurality of liquid crystal elements held between the grid-like transparent electrodes. Each liquid crystal element corresponds to different regions of an image recorded on a negative film. When some of the liquid crystal elements are selectively supplied with electric signals equal to or greater than the predetermined voltage under the control of the controller 18, as will be described hereinafter, beams of light passing through the selected liquid crystal elements of the liquid crystal cell 19 are prevented from being polarized, but beams of light passing through the other liquid crystal elements are polarized to be rotated by 90° or 270°.

On the other hand, the second polarized light 16b which is split by the first polarizing beam splitter 15 so as to be split from the first polarized light 16a is reflected by a full reflex mirror 21 inclined by 45° with respect to the axis of the light radiated from the lamp 10 so that the reflected light proceeds toward tile second liquid crystal cell 22. The second polarized light 16b is then polarized by the second liquid crystal 22 so that the plane of polarization is rotated by 90° or 270°, and then enters the second polarizing beam splitter 24. The second liquid crystal 22 comprises a TN type liquid crystal or a STN type liquid crystal.

At the second polarizing beam splitter 24, the first polarized light 16a for which the plane of polarization in each of a plurality of small regions was changed by the liquid crystal elements when passed through the first liquid crystal cell 19 is combined with the second polarized light 16b for which the plane of polarization was rotated by 90° or 270° by the second liquid crystal cell 22. The combined light is projected on a frame of a negative film 26 supported by film carriers 25 and 25'.

When it is detected by the film carriers 25 and 25' that the frame to be printed is properly positioned, an image recorded on the frame is exposed on a print paper 30 via a half mirror 28 and a print lens 29.

Disposed between the print lens 29 and the print paper 30 is a shutter 31 which is opened and closed by a shutter drive section 32.

A half mirror 28 disposed between the film carrier 25 and the print lens 29 acts to reflect some of the light for printing to a light measurement/monitoring system 33. The reflected light is lead to a simulation image sensor 36 simulation and a photometric image sensor 37 via a lens 34 and a half mirror 35, so that images are formed on the image sensors 36 and 37, respectively.

The simulation image sensor 36 captures a negative image on the frame to be printed, and supplies a monitor image processing section 38 with a video signal representing the captured image. As is well known, the monitor image processing section 38 carries out A/D conversion, negative-to-positive conversion, gradation compensation, saturation compensation and the like to display on a color CRT 39 a simulated monitor image representing a finished print. The saturation compensation is carried out to compensate for the difference between the spectral sensitivity of the print paper 30 and the spectral sensitivity of the image sensor 36, as well as for reflecting a desired compensation, when compensation data are input, so as to display a compensated image on the display. The compensation data is input through a keyboard 40 connected to the controller (control section) 18. Density compensation data and color compensation data thus input are displayed on the display 41 and also fed to the monitor image processing section 38.

The photometric image sensor 37 meters the three primary colors at a plurality of locations in a frame to be printed. The measured signals are sent to a characteristic value calculation section 42. The characteristic value calculation section 42 calculates LATD and other characteristic values and then transmits them to an exposure amount calculation section 43. The exposure amount calculation section 43 calculates the amount of light for exposure (hereinafter referred to as "exposure amount") for each of the primary colors in accordance with a known formula, and then sends them to the controller 18. In the calculation of the exposure amounts, compensation data input from the keyboard 40 are used if needed.

The controller 18 calculates a length of time for exposure and positions of the filters based on the exposure amounts determined for the primary colors, and it outputs drive control signals to the liquid crystal controller 23 and the light-quality adjusting section 13 based on the calculated values. In response to the drive control signals, the liquid crystal controller 23 outputs drive signals to the liquid crystal cell 19 so as to change the densities of the liquid crystal elements of the liquid crystal cell 19 so that the amount of light passing through each of the liquid crystal elements is controlled to a predetermined value. Further, the light-quality adjusting section 13 responds to the drive control signals from the controller 18 and advances the C, M and Y filters into the path of light. Simultaneously with the driving of the liquid crystal 23, the controller 18 also activates the shutter drive section 32 to open the shutter 31 for a predetermined period of time so that an image on a frame of the negative film 19 to be printed is exposed on the photographic printing paper 30. The relationship between exposure amount and drive signals supplied to the liquid crystal cell 19 is previously experimentally determined and stored in the memory of the controller 18 as a conversion table.

In order to change the gradation of an image to be exposed, the gradation of the image is first detected based on the intensity of light measured by the image sensor 37 for metering, and the transmittance of each of the liquid crystal elements is changed by a predetermined amount based on the detected degree of gradation.

In the measurement of the distribution of density of an image on the negative film which is carried out by the image sensor 37 for metering, sometimes a part of the image on the negative film has an extremely low density. In this case, since such a portion is reproduced on a print paper with uniformly high density, the gradation of the portion cannot be properly produced on the print paper if the exposure is carried out without compensation. For example, in a landscape photograph which is taken in natural light, a portion corresponding to shade is reproduced to be uniformly dark, which makes it difficult to properly reproduce the gradation.

Figure 2:
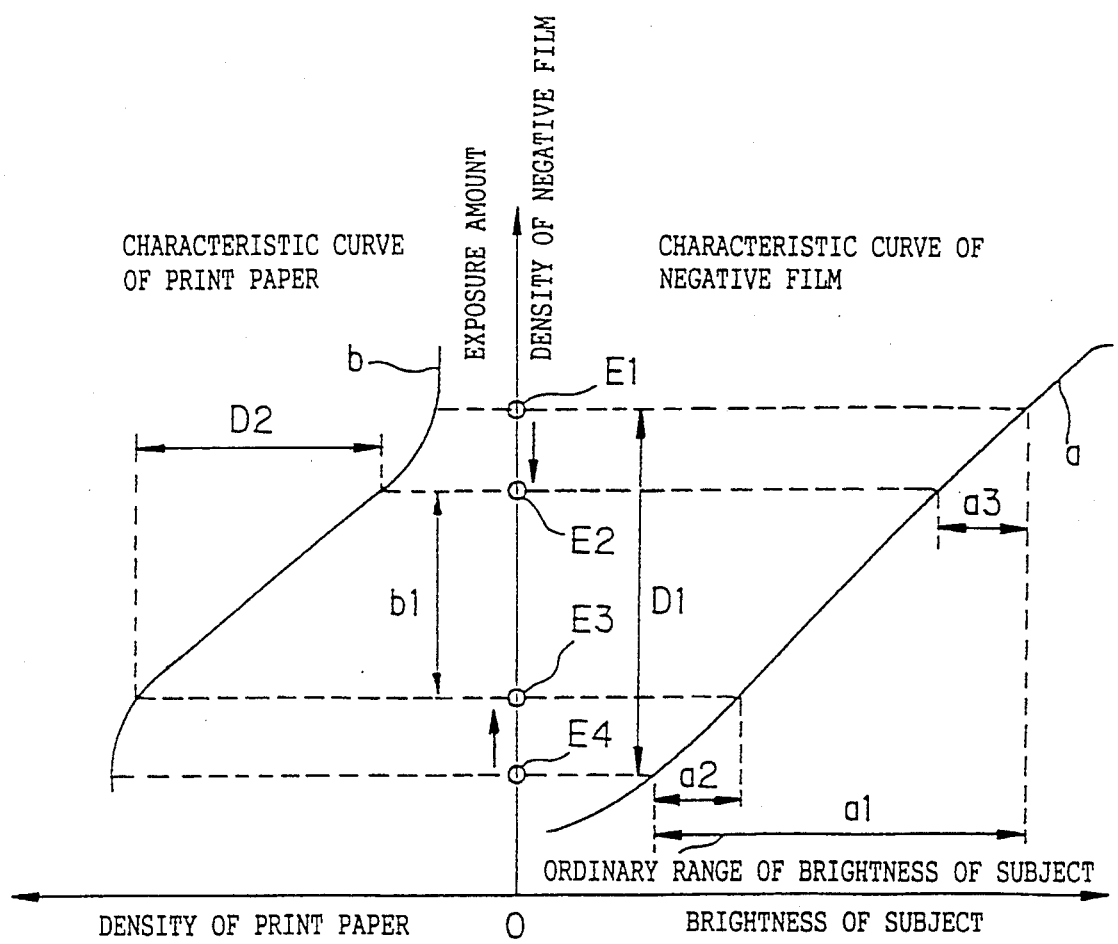
FIG. 2 is a graph chart showing a characteristic curve of a photographic film and a characteristic curve of a print paper.

As shown by the characteristic curve a of a negative film and the characteristic curve b of a photographic printing paper in FIG. 2, the range D2 in which the density of the print paper changes, which corresponds to the range b1 in which the exposure amount onto the photographic printing paper changes, is narrower than the range D1 in which the density of the negative film changes, which corresponds to the range a1 in which the exposure amount onto the negative film (corresponding to the brightness of a photographic subject) changes. Accordingly, if the photographic printing paper is exposed with such an intensity that the center of the sensitive range of the photographic printing paper coincides with the center of the range in which the density of images recorded on the negative film varies, the portion having a high density falling in a high density range a3 (or a portion having a low density falling in a low density range a2) is printed on the photographic printing paper as white (or black), resulting in destruction of images and loss of gradation.

When the image sensor detects such an image on the negative film, the drive signals for driving the liquid crystal is controlled such that the liquid crystal elements of the liquid crystal cell 19 corresponding to the region having a density entering the rather low density range a2 have reduced transmittances. As a result, the photographic printing pater is exposed under conditions which are equivalent to those in the case where the density of the negative film (exposure amount) is increased from E4 to E3. It was confirmed by using the image sensor 36 that the gradation characteristic can be sufficiently utilized when the amount of light projected onto the negative film 26 is adjusted based on the density of the region having a high density. By reproducing an image recorded on the negative film 26 onto the photographic printing paper under the above-described conditions, it was confirmed that the part of the image on the negative film 26 which has a low density can be properly exposed and printed onto the photographic printing paper.

Similarly, the drive signals for the liquid crystal are controlled such that the liquid crystal elements corresponding to the region having a fairly high density entering the high density range a3 have reduced transmittances. As a result, the photographic printing paper is exposed under conditions which are equivalent to those in the case where the density of the negative film (exposure amount) is reduced from E1 to E2, thereby making it possible to sufficiently utilize the gradation characteristic even in the region having a high density entering the region a3.

In order to carry out exposure incorporating the above-described gradation compensation, the second polarized light 16b which did not pass through the liquid crystal cell 19 is combined with the first polarized light 16a which passed through tile liquid crystal 19. The combined light is used for illuminating the negative film 26 so as to effect exposure. Since the second polarized light 16b, which is not used in conventional photographic printers, is effectively used to increase the exposure amount, the time required for exposure can be shortened. For example, according to the above-described arrangement, the exposure amount increases to three times and the time required for exposure is therefore shortened to one third that for a photographic printer in which the above-described compensation is carried out by a liquid crystal cell provided with a pair of polarizing plates.

The above-described structure may be modified in such a way that the first liquid crystal cell 19 and the condenser lenses 17 are exchanged in position with the second liquid crystal cell 22.

Embodiment 2

Figure 3:
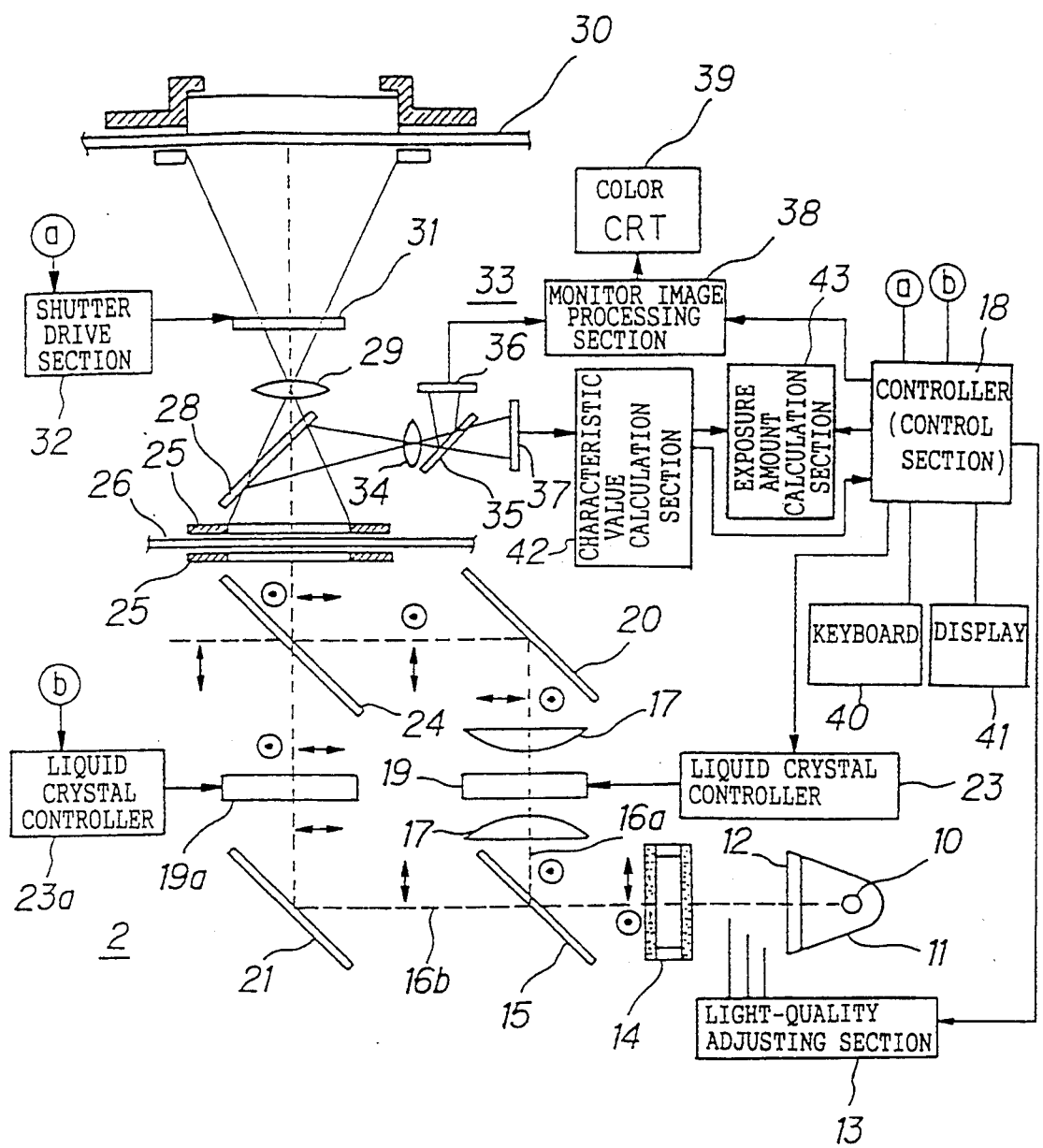
FIG. 3 is a sectional view schematically showing the structure of a photographic printer according to a second embodiment of the present invention.

FIG. 3 is a vertical cross section schematically showing the structure of a photographic printer 2 according to a second embodiment of the present invention. In FIG. 3, the structural elements which are like those in the photographic printer 1 according to the first embodiment shown in FIG. 1 are indicated using like symbols. The description of the first embodiment will be referred to for the detailed structure and operation of the like structural elements.

In the photographic printer 2 according to tills embodiment, an illumination apparatus comprising a lamp 10, a reflector 11, and a heat insulating filter 12 is disposed on the right side of the first polarizing beam splitter 15, as viewed in FIG. 3. A light-quality adjusting section 13 and a diffusion box 14 are disposed between the illumination apparatus and the first polarizing beam splitter 15.

Further, a liquid crystal cell 19a and a liquid crystal controller 23a which have the same structures and functions as those of the first liquid crystal cell 19 and the liquid crystal controller 23 are disposed between a full reflex mirror 21 and a second polarizing beam splitter 24. Remaining portions are the same as those of the photographic printer 1 of FIG. 1.

In the photographic printer 2 according to this embodiment light emitted from the lamp 10 and reflected by the reflector 11 passes through the heat insulating filter 12, the light-quality adjusting sect[on 13 and the diffusion box 14, and then enters the first polarizing beam splitter 15, where the light is split into first and second polarized lights 16a and 16b having planes of polarization different from each other. The first polarized light 16a is refracted so as to enter a set of condenser lenses 17 and passes through the first liquid crystal cell 19 as a parallel beam. When the liquid crystal controller 23 supplies electric signals of a predetermined level to selected liquid crystal elements of the liquid crystal cell 19 in accordance with the image data which are stored in the controller 18 and which represent an image recorded on a negative film, beams of light passing through the selected liquid crystal elements of the liquid crystal cell 19 are prevented from being polarized, but beams of light passing through other liquid crystal elements to which electric signals of the predetermined level are not applied are polarized to be rotated by 90° or 270°. The light passing through the liquid crystal cell 19 enters the second polarizing beam splitter 24 after being reflected by a full reflex mirror 20.

On the other hand, the second polarized light 16b which passed through the first polarizing beam splitter 15 is reflected by a full reflex mirror 21 and proceeds toward the second polarizing beam splitter 24. Along the way, the second polarized light 16b passes through tile liquid crystal cell 19a. Similarly to the above-described first liquid crystal 19, when the liquid crystal controller 23a supplies electric signals to selected liquid crystal elements of the liquid crystal cell 19a in accordance with the image data stored in the controller 18, beams of light passing through the selected liquid crystal elements to which are applied electric signals of the predetermined level are prevented from being polarized, but beams of light passing through other liquid crystal elements to which electric signals of the predetermined level are not applied are polarized to be rotated by 90° or 270°. The light passing through the liquid crystal cell 19a also enters the second polarizing beam splitter 24.

The beams of first light 16a from the first liquid crystal 19 and the beams of second light 16b which have reached the second polarizing beam splitter are split into a first kind of beams which pass through the second polarizing beam splitter 24, and a second kind of beams which are refracted by the second polarizing beam splitter 24 to be used for exposure. Beams belonging to the second kind used for exposure are combined with each other and are used for exposure. Accordingly, it is possible to minimize the amount of light changing to heat and solve the conventional drawbacks, such as the necessity of a prolonged time for exposure and the necessity of a stronger light source. Further, since the illumination apparatus is disposed on a side of the first polarizing beam splitter, the photographic printer occupies a reduced space, making the installation of the photographic printer easier.

The structure according to the second embodiment may be modified such that the illumination apparatus comprising the lamp 10, the reflector 11 and the heat insulating filter 12 is disposed below the first polarizing beam splitter 15, as viewed in FIG. 3, to radiate light in the same manner as in the first embodiment.

Embodiment 3

Figure 4:
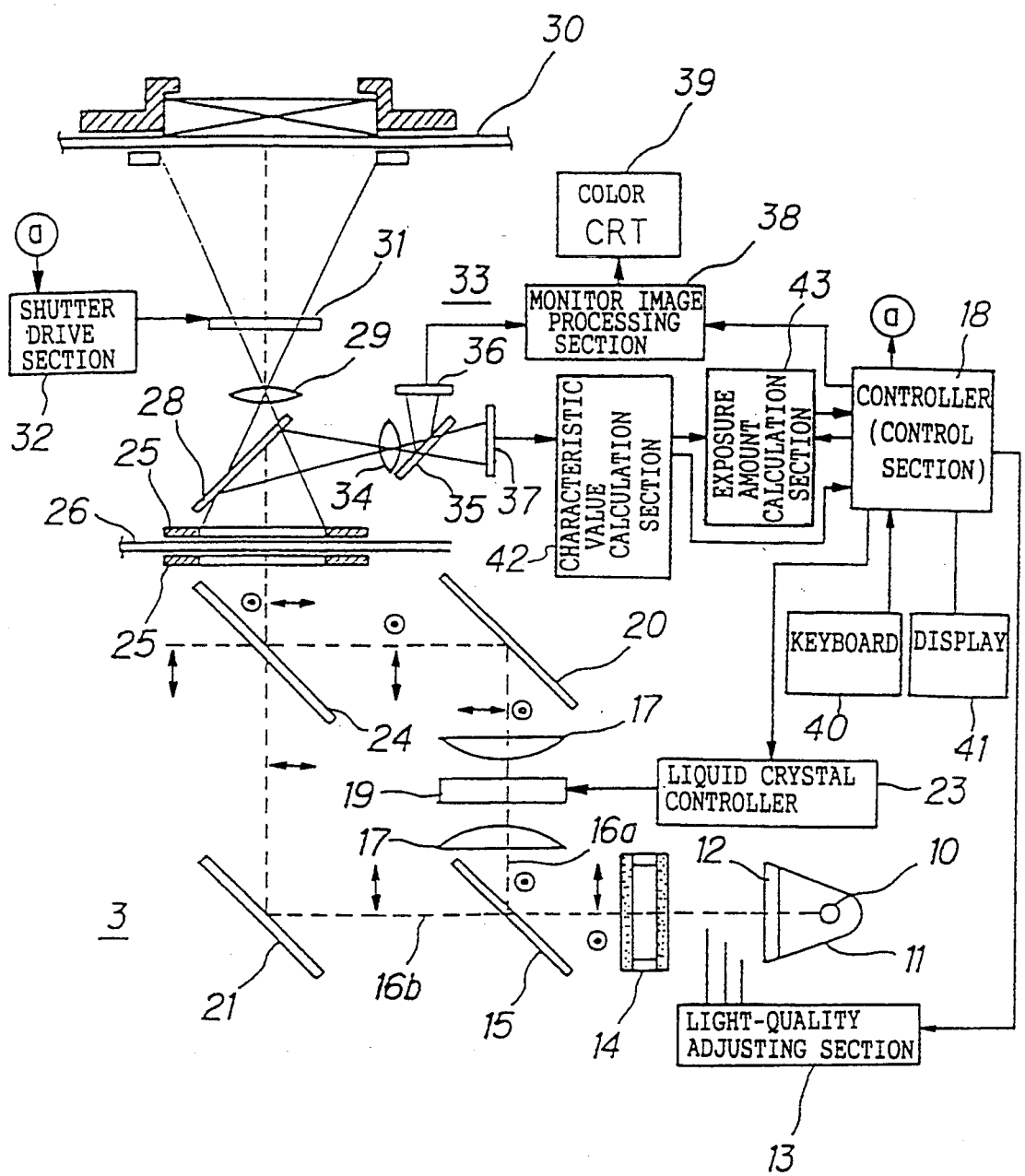
FIG. 4 is a sectional view schematically showing the structure of a photographic printer according to a third embodiment of the present invention.

FIG. 4 is a vertical cross section schematically showing the structure of a photographic printer according to a third embodiment of the present invention. In FIG. 4, similarly to the second embodiment, the structural elements which are like those in the photographic printer 1 according to the first embodiment shown in FIG. 1 are indicated using like symbols. The description of the first embodiment will be referred to for the structure and operation of the like structural elements. The photographic printer 3 according to the third embodiment has a structure obtained by deleting the liquid crystal cell 19a and the liquid crystal controller 23a from the photographic printer 2 of the second embodiment.

In the photographic printer 3 having the above-described structure, light entering the first polarizing beam splitter 15 is split into first polarized light 16a vibrating in a plane perpendicular to the sheet as viewed in FIG. 1 and second polarized light 16b vibrating in a plane parallel to the sheet.

The first polarized light 16a enters condenser lenses 17 and passes through a first liquid crystal cell 19 as a parallel beam. When the liquid crystal controller 23 supplies electric signals of a predetermined voltage level to selected liquid crystal elements of the liquid crystal cell 19 in accordance with the image data which are stored in the controller 18 and which represent an image recorded on a negative film, beams of light passing through the selected liquid crystal elements of the liquid crystal cell 19 are prevented from being polarized, but beams of light passing through other liquid crystal elements to which electric signals of the predetermined voltage level are not applied are polarized to be rotated by 90° or 270°. The light passing through the liquid crystal cell 19 enters the second polarizing beam splitter 24 after being reflected by a full reflex mirror 20.

On the other hand, the second polarized light 16b split by the first polarizing beam splitter 15 is reflected by a full reflex mirror 21 and proceeds toward the second polarizing beam splitter 24 and enters therein.

The beams of first light 16a passing through the first liquid crystal 19 are split by the second polarizing beam splitter 24 into a first kind of beams which pass through the second polarizing beam splitter 24, and a second kind of beams which are refracted by the second polarizing beam splitter 24 to be used for exposure. Beams belonging to the second kind used for exposure are combined with the beams of second light 16b and are used for exposure.

Accordingly, it is possible to minimize the amount of light changing to heat and solve the conventional drawbacks, such as the necessity of a prolonged exposure time and the necessity of a stronger light source. Further, according to the third embodiment, density compensation, color compensation and the like can be carried out by using a single liquid crystal cell 19.

Similar effects can be obtained when the third embodiment is modified in such a way that the first liquid crystal cell 19 and the condenser lenses 17 are removed from the path of the first polarized light 16a and disposed between the full reflex mirror 21 and the second polarizing beam splitter 24 to be located in the path of the second polarized light 16b.

In the photographic printers according to the present invention, a pair of polarizing beam splitters are used instead of polarizing plates which are used in conventional photographic printers. The first polarized light and the second polarized light split by the first polarizing beam splitter are combined by the second polarizing beam splitter after their intensities have been adjusted, and the combined light is used to illuminate a photographic film so that an image is exposed on a light-sensitive material. Accordingly, both of the first and second polarized lights split by the first polarizing beam splitter can be efficiently used for exposure. Therefore, the photographic printer according to the present invention has the capability of utilizing light effectively, as well as the capability of controlling the amount of light reaching each small region of an image to be exposed by changing the transmittances of a plurality of liquid crystal elements corresponding to the small regions. The latter capability makes it possible to accurately and easily conduct various types of image processing such as density compensation and color compensation for each of the small regions, shading, and the printing of characters in a shorter time.

What is claimed is:

1. A photographic printer for exposing and printing on a light-sensitive material an image which is recorded on a photographic film, comprising:
   a light source for illuminating a photographic film;
   a first polarizing beam splitter disposed between said light source and said photographic film for splitting light from said light source into a first polarized light and a second polarized light;
   a second polarizing beam splitter disposed between said first polarizing beam splitter and said photographic film for combining said first polarized light and said second polarized light; and
   a first liquid crystal cell disposed in a selected one of the path of said first polarized light and the path of said second polarized light, and including a liquid crystal compound which is held between transparent electrodes which are arranged in matrix form on two opposing surfaces perpendicularly intersecting the selected path of light so as to form grid-like transparent electrodes on said surfaces, the orientation of said liquid crystal compound changing depending on drive signals supplied to said grid-like transparent electrodes in accordance with compensation information,
   wherein that one of said first and second polarized light which has passed through said first liquid crystal cell is combined with the other of said first and second polarized lights, and the combined light is projected onto said photographic film so that an image recorded on said photographic film is exposed onto said light-sensitive material and printed thereon.

2. A photographic printer according to claim 1, wherein said first liquid crystal cell is disposed between a pair of condenser lenses provided on said selected one of the paths of said first polarized light and second polarized light.

3. A photographic printer according to claim 1, further comprising a second liquid crystal cell which is disposed in the other of the paths of said first polarized light and second polarized light to rotate the axis of polarization by 90° or 270° when the other of said first polarized light and second polarized light passes therethrough.

4. A photographic primer according to claim 1, further comprising a second liquid crystal cell disposed in the other of the paths of said first polarized light and second polarized light and including a liquid crystal compound which is held between transparent electrodes which are arranged in matrix form on two opposing surfaces perpendicularly intersecting a non-selected path of light so as to form grid-like transparent electrodes on the surfaces, the orientation of said liquid crystal material changing depending on drive signals which are supplied to said grid-like transparent electrodes in accordance with compensation information.

5. A photographic printer according to claim 1, wherein said liquid crystal compound is selected from the group consisting of a TN liquid crystal and a ferroelectric liquid crystal.

6. A photographic printer according to claim 1, wherein a plane in which said first polarized light vibrates and a plane in which said second polarized light vibrates are perpendicular to each other.

7. A photographic printer according to claim 1, wherein said light source is disposed so as to radiate said light in a substantially horizontal direction.

8. A photographic printer according to claim 1, wherein said liquid crystal material is divided between said grid-like transparent electrodes to form plural liquid crystal elements, and said drive signals are supplied to said plural liquid crystal elements via said grid-like transparent electrodes.

9. A photographic primer for exposing and priming on a light-sensitive material an image which is recorded on a photographic film, comprising:
   a light source for illuminating a photographic film;
   a first polarizing beam splitter disposed between said light source and said photographic film for splitting light from said light source in a first polarized light and a second polarized light;
   a second polarizing beam splitter disposed between said first polarizing beam splitter and said photographic film for combining said first polarized light and said second polarized light; and
   a first liquid crystal cell disposed in a selected one of the path of said first polarized light and the path of said second polarized light, and including a liquid crystal compound which is held between transparent electrodes which are arranged in matrix form on two opposing surfaces perpendicularly intersecting the path to form grid-like transparent electrodes on the surfaces, the orientation of said liquid crystal compound changing depending on drive signals which are supplied to said grid-like transparent electrodes in accordance with compensation information,
   wherein said first polarized light which has passed through said first liquid crystal cell is combined with said second polarized light which has passed through said second liquid crystal cell, and the combined light is projected on said photographic film is exposed on said light-sensitive material and printed thereon.

10. A photographic printer according to claim 9, wherein said first liquid crystal cell is disposed between a pair of condenser lenses provided in the path of said first polarized light.

11. A photographic printer according to claim 9, wherein said liquid crystal compound is selected from the group consisting of a TN liquid crystal and a ferroelectric liquid crystal.

12. A photographic printer according to claim 9, wherein a plane in which said first polarized light vibrates and a plane in which said second polarized light vibrates are perpendicular to each other.

13. A photographic printer according to claim 9, wherein said light source is disposed so as to radiate said light in a substantially horizontal direction.

14. A photographic printer according to claim 9, wherein said liquid crystal compound is divided between said grid-like transparent electrodes to form plural liquid crystal elements, and said drive signals are supplied to said plural liquid crystal elements via said grid-like transparent electrodes.

15. A photographic printer for exposing and printing on a light-sensitive material an image which is recorded on a photographic film, comprising:
   a light source for illuminating a photographic film;
   a first polarizing beam splitter disposed between said light source and said photographic film for splitting light from said light source into a first polarized light and a second polarized light;
   a second polarizing beam splitter disposed between said first polarizing beam splitter and said photographic film for combining said first polarized light and said second polarized light; and
   a first and a second liquid crystal cell disposed in the path of said first polarized light and the path of said second polarized light, respectively, and each including a liquid crystal compound which is held between transparent electrodes which are arranged in matrix form on two opposing surfaces perpendicularly intersecting the respective path of light to form grid-like transparent elements on the surfaces, the orientation of said liquid crystal compound changing depending on drive signals which are supplied to said grid-like transparent electrodes in accordance with compensation information,
   wherein said first polarized light which has passed through said first liquid crystal cell is combined with said second polarized light which has passed through said second liquid crystal cell, and the combined light is projected on said photographic film so that an image recorded on said photographic film is exposed on said light-sensitive material and printed thereon.

16. A photographic printer according to claim 15, wherein said first liquid crystal cell is disposed between a pair of condenser lenses provided in the path of said first polarized light.

17. A photographic printer according to claim 15, wherein said liquid crystal compound is selected from the group consisting of a TN liquid crystal and a ferroelectric liquid crystal.

18. A photographic printer according to claim 15, wherein a plane in which said first polarized light vibrates and a plane in which said second polarized light vibrates are perpendicular with each other.

19. A photographic printer according to claim 15, wherein said light source is disposed so as to radiate said light in a substantially horizontal direction.

20. A photographic printer according to claim 15, wherein said liquid crystal compound is divided between said grid-like transparent electrodes to form plural liquid crystal elements, and said drive signals are supplied to said plural liquid crystal elements via said grid-like transparent electrodes.

* * * * *